United States Patent [19]

Hoefer et al.

[11] Patent Number: 5,065,923
[45] Date of Patent: Nov. 19, 1991

[54] FOOD SUPPORTING ELEMENT FOR ATTACHMENT TO A FOOD CONTAINER

[76] Inventors: Richard Hoefer; Clovia Hoefer, both of 249 Stillwater La., Billings, Mont. 59105

[21] Appl. No.: 567,092
[22] Filed: Aug. 14, 1990
[51] Int. Cl.⁵ ............................................. G01F 11/26
[52] U.S. Cl. .................................... 220/694; 220/527; 220/358; 220/574; 220/23.83; 220/501; 220/529; 220/543; 141/320; 222/457; 222/584
[58] Field of Search ................................ 141/319–322, 141/381; 222/454, 457, 584, 569, 570; 220/90.2, 501, 522, 527, 90.4, 358, 378

[56] References Cited

U.S. PATENT DOCUMENTS

| | | | |
|---|---|---|---|
| 562,440 | 6/1896 | Vandersall | 220/90.2 |
| 611,093 | 9/1898 | Baldwin | 222/584 |
| 1,963,261 | 6/1934 | Cuthbert | 222/584 |
| 1,970,451 | 8/1934 | Gottlieb | 141/321 |
| 2,149,988 | 3/1939 | Ashley | 222/584 |
| 2,187,029 | 1/1940 | Hevers | 220/522 |
| 2,772,016 | 11/1956 | Bristol | 220/358 |
| 3,265,255 | 8/1966 | Mitchell | |
| 3,716,173 | 2/1973 | Yasso | 222/457 |
| 3,806,023 | 4/1974 | Barnett | |
| 3,917,129 | 11/1975 | Cavazza | 222/454 |
| 4,159,791 | 7/1979 | Crutcher | 141/322 |
| 4,619,372 | 10/1986 | McFarland | |
| 4,934,552 | 6/1990 | Koide et al. | 220/358 |
| 4,974,749 | 12/1990 | Mon | 141/381 |
| 5,319,614 | 3/1982 | Boice | 220/522 |

FOREIGN PATENT DOCUMENTS

| | | | |
|---|---|---|---|
| 37510 | 5/1927 | Denmark | 120/71 |
| 2262384 | 7/1973 | Fed. Rep. of Germany | 222/454 |
| 2324080 | 12/1974 | Fed. Rep. of Germany | 222/454 |
| 792348 | 12/1935 | France | 222/584 |
| 4279 | of 1888 | United Kingdom | 222/584 |

Primary Examiner—Stephen Marcus
Assistant Examiner—S. Castellano
Attorney, Agent, or Firm—Terry M. Gernstein

[57] ABSTRACT

A food supporting element is used to support food, such as dip, in position near the open mouth of a food container to be easily accessible for serving. The supporting element includes a bowl that is spaced from the container, and is mounted on the container near the cover for that container. When the cover is closed, the container is inverted so food product moves past the food supporting bowl, and is then re-inverted to an upright orientation so food is supported on the bowl. The container is then opened and the food supported on the bowl is in position for serving.

1 Claim, 2 Drawing Sheets

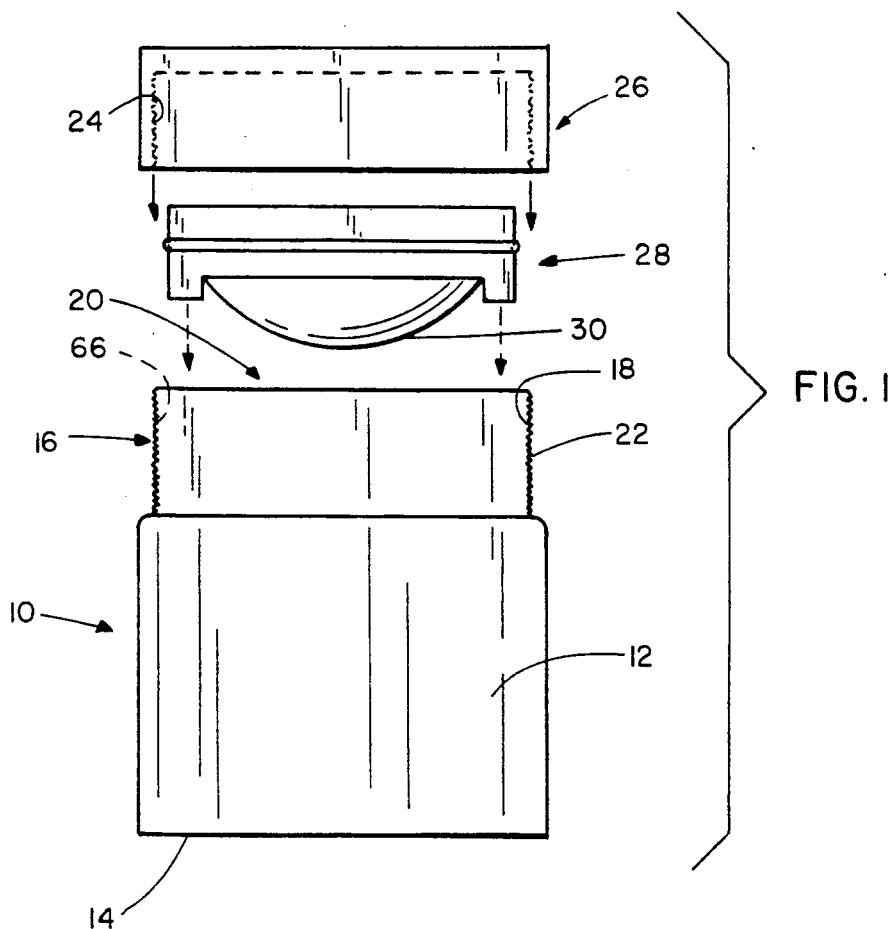
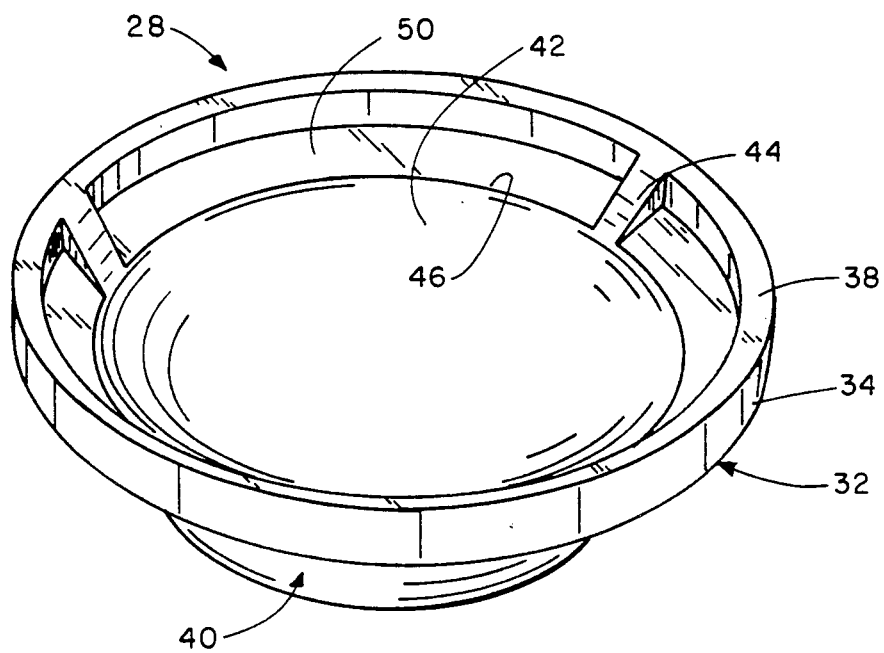

5,065,923

FOOD SUPPORTING ELEMENT FOR ATTACHMENT TO A FOOD CONTAINER

TECHNICAL FIELD OF THE INVENTION

The present invention relates to the general art of containers, and to the particular field of inserts and attachments for use on food containers.

BACKGROUND OF THE INVENTION

Many modern snacks includes a sauce into which a cracker-like food product is dipped. Such sauces are so prevalent that they are often sold under the functional definition as a generic name, e.g., "dips."

Dips range in consistency from quite thick and viscous to nearly liquid-like, and are generally sold in containers that are sealed for storage. Many dips have proved to be quite difficult to eat due to the messy nature of the application thereof to the cracker-like food product. The cracker is dipped into the sauce, dragged through the sauce and removed for eating. In certain circumstances, this process can be difficult to carry out in a neat manner, and thus the full enjoyment of the food product can be inhibited. This is especially so in the instance where the dip is nearly gone, and the container is deep. The cracker-like product must be thrust into the container, and withdrawn in an awkward manner.

Accordingly, the dip is often removed from its packaging container, and placed on a shallow bowl for serving. This overcomes some of the problems of serving dip, however, it presents other problems. The bowls must be constantly replenished, and then cleaned after use. The use of separate serving bowls also discourages a manufacturer from selling the dip food product in distinctive and eye-catching containers, since the container will not receive a full exposure.

Therefore, there is a need for a food supporting element that can be attached to a food container, such as a food dip jar, and which will support food in that container in position to be easily eaten, yet can be sold as part of the packaging for the dip, and is easily refilled as needed.

OBJECTS OF THE INVENTION

It is a main object of the present invention is to provide a food supporting element that can be attached to a food container.

It is another object of the present invention to provide a food supporting element that can be attached to a food container, including a dip jar.

It is another object of the present invention to provide a food supporting element that can be attached to a food container, including a dip jar and which will support food in that container in position to be easily eaten.

It is another object of the present invention to provide a food supporting element that can be attached to a food container, including a dip jar and which will support food in that container in position to be easily eaten, yet can be sold as part of the packaging for the dip.

It is another object of the present invention to provide a food supporting element that can be attached to a food container, including a dip jar and which will support food in that container in position to be easily eaten, yet can be sold as part of the packaging for the dip, and is easily refilled as needed.

SUMMARY OF THE INVENTION

These, and other, objects are achieved by a food-supporting element that is mounted inside of a food container near the mouth of that container. The element is mounted in a manner that permits the food in the container to move from one location in the container, such as near the bottom of the container, to another location in the container, such as near the mouth of the container, past the supporting element, and to then settle onto the supporting element in a position to be easily accessible to a cracker-like food product.

The food-supporting element includes a food support which is in the shape of a shallow bowl, and is thus effective in serving the dip directly from the container.

Thus, the container used to package and seal the food product can be used to serve that food product, yet such service is still efficient and neat. The closed container is merely inverted and moved to move the food product from the container into a position adjacent the top of the bowl-shaped food support, the closed container is then placed back in an upright position, and opened. Some of the food product in the container is located on the bowl in a convenient position for serving.

The food supporting bowl can be an integral part of a food package, or can be separable therefrom.

BRIEF DESCRIPTION OF THE DRAWING FIGURES

FIG. 1 is an exploded elevational view of the food-supporting element in conjunction with a food container.

FIG. 2 is a top perspective view of a food-supporting element embodying the present invention.

DETAILED DESCRIPTION OF THE PREFERRED EMBODIMENT OF THE INVENTION

Figure 3:
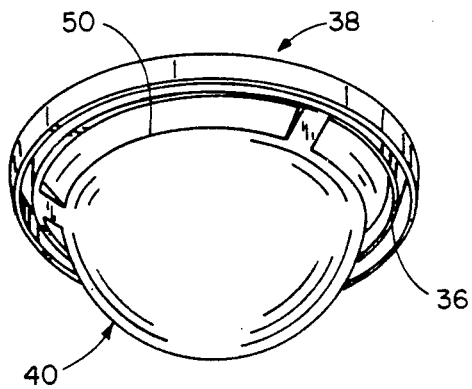
FIG. 3 is a bottom perspective view of a food-supporting element embodying the present invention.
Figure 4:
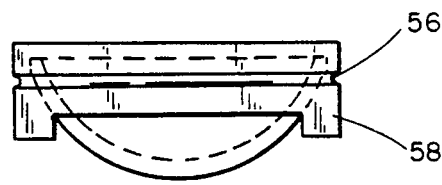
FIG. 4 is a side elevational view of one form of the food-supporting element of the present invention.

Shown in FIG. 1 is a container 10 of the type used to package and store dip-like food products such as are commonly eaten on a cracker-like food product. It is noted that cracker-like products are specifically disclosed herein, however other types of food products can also be used without departing from the scope of the present invention, and no limitation is intended by such delineation of food item.

The container includes a body 12 having a bottom 14 and a neck portion 16 which terminates in a rim 18 which defines and circumscribes an open mouth 20 through which food product passes into and out of the container. A threaded portion 22 is located on the container neck and co-operates with a threaded portion 24 of a cap 26 which is used to close and seal the container.

In prior circumstances, food from the container 10 would be poured out of that container into shallow serving bowls or eaten directly from the container 10. As discussed above, each of these serving options has disadvantages. Accordingly, the present invention is embodied in a food serving element 28 that is attached to the container 10 near the mouth 20 of that container. Food from the container is moved from one location in that container past a bottom portion 30 of the serving element 28 and onto a top portion of that serving element to be located adjacent to the open mouth of the container in a position to be conveniently reached by a cracker-like food product.

The first form of the serving element 28 is best shown in FIGS. 2 and 3 as including a support rim 32 which is C-shaped in cross section to have two legs 34 and 36 connected to a bight section 38. The container rim is received between the legs 34 and 36, and the container rim abuts the bight section 38 so that the support rim 32 fits onto the container rim. These legs are sized so as not to interfer with operation of a jar lid.

The serving element 28 further includes a food-support bowl 40 that is concave with respect to an upper surface 42 and with respect to the top of the container when the element is supported in position over the mouth of the container. The bowl 40 is generally shallow and can be formed of plastics-type material which is compatible with, yet is impervious to, the food product being served, and surface 30 of the bowl element is convex.

The bowl 40 is supported from the support rim 32 by a series of spaced apart arm elements, such as arm element 44. The arm elements form a spider-like support that, with the outer rim 46 of the bowl and the rim support defining a plurality of gaps, such as gap 50, that extend from the rim support to the bowl and between the arms.

When the food-supporting element is mounted on the container, food from the container can be placed on the upper surface 42 by closing the container with the cover 26 with the element 28 mounted on the container, inverting the container from the right-side up orientation shown in FIG. 1 and moving the container in a shaking motion. Food product will flow past the bowl via the gaps 50 and rest against the cover. When the container is re-inverted to the right side up orientation, food resting on the cover 26 will fall onto the bowl upper surface 42 and be supported thereon. The cover 26 is then removed, and the food resting on the bowl is in position to be readily accessible for serving.

Two other forms of the element are shown in the figures, and the alternative forms permit the food supporting element to be inserted into the container without danger of interfering with the operation of the co-operating threads 22 and 24 when the cover is threaded onto the container.

Figure 6:
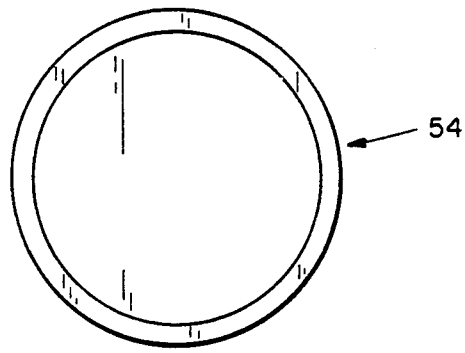
FIG. 6 is a top plan view of an elastomeric static seal having a round cross section which can be used in conjunction with one form of the food supporting element of the present invention.

The two alternate forms of the element include an elastomeric static seal, such as the O-ring 54 shown in FIG. 6, and the O-ring 54 fits into a seal groove 56 defined in the outer surface 58 on the element leg 34. When the outer surface 58 of the support rim is brought together with the inner surface 60 of the container neck, the rubber ring is squeezed and deformed. This deformation creates a pressure that effectively blocks any leak path between these two elements, and prevents leakage of the food product. The alternative forms of the support are thus supported inside the container and do not have any portion thereof located to interfere with the operation of the threads on the container or on the cover.

Figure 5:
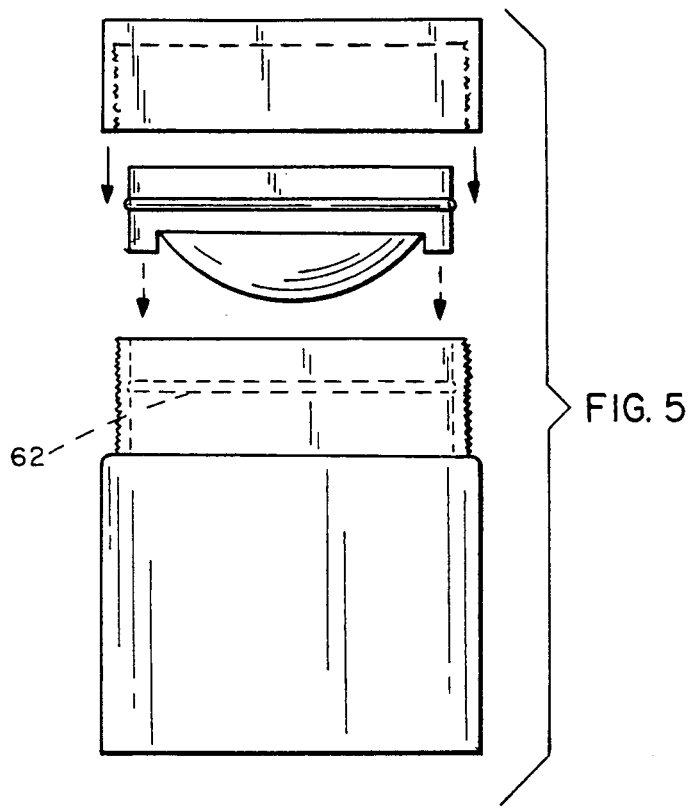
FIG. 5 is an exploded elevational view of another form of the food-supporting element of the present invention.

The container neck can have a groove 62 defined therein as shown in FIG. 5, with the groove 62 being complementary with the groove 56 whereby the O-ring 54 snaps into both of the grooves to lock the element 28 in place in the neck of the container. Otherwise, the alternative forms of the element 28 operate in the same manner as the primary form of the element 28.

Seals and the like can also be included so a jar having the device thereon can be stored without leakage, even if the jar is stored in an inverted position.

It is understood that while certain forms of the present invention have been illustrated and described herein, it is not to be limited to the specific forms or arrangements of parts described and shown.

I claim:

1. A food-supporting element for attachment to a food container comprising:

A) a support rim means which includes means for mounting said support rim means on the food container adjacent to a mouth of that food container to be located inside the food container, said support rim means being U-shaped and including two legs attached to a bight section, said support rim further including a seal seating groove defined in one leg of said support rim legs and an O-ring located in said seating groove, said one leg being located adjacent to said container mouth and the other leg of said two legs being spaced from said container mouth when said support rim means is mounted on said container;

B) a food support bowl attached to said support rim means and spanning the food container mouth when the support rim means is mounted on the food container, said food support bowl being impervious to food container in the container and having a concave surface and a convex surface, with said concave surface being located adjacent to a rim of the container, said container rim circumscribing the mouth of the container;

C) bowl attaching means attaching said bowl to said support rim means, said bowl attaching means including a plurality of spaced-apart arms connecting said food support bowl to said support rim means, said spaced apart arms forming gap-defining means defining a plurality of gaps between said support rim means and said bowl so food contained in the container can flow through said plurality of gaps to move onto said bowl concave surface to be supported on said concave surface adjacent to the container mouth; and D) a seal seating groove defined on the container adjacent to the container mouth to be aligned with said support rim seal seating groove when said support rim means is mounted on the container, said O-ring being accommodated in said container seal seating groove and in said support rim seal seating groove and preventing food seepage between said support rim means and said container.

* * * * *